(12) United States Patent
Dai

(10) Patent No.: US 9,420,344 B2
(45) Date of Patent: Aug. 16, 2016

(54) METHOD AND SYSTEM FOR USER RATING BY UTILIZING PROGRAM SERVICE GUIDE

(71) Applicant: ZTE CORPORATION, Shenzhen, Guangdong Province (CN)

(72) Inventor: Wei Dai, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/421,498

(22) PCT Filed: Aug. 15, 2013

(86) PCT No.: PCT/CN2013/081527
§ 371 (c)(1),
(2) Date: Feb. 13, 2015

(87) PCT Pub. No.: WO2014/026621
PCT Pub. Date: Feb. 20, 2014

(65) Prior Publication Data
US 2015/0222954 A1 Aug. 6, 2015

(30) Foreign Application Priority Data

Aug. 16, 2012 (CN) .......................... 2012 1 0292155

(51) Int. Cl.
*H04N 5/445* (2011.01)
*G06F 3/00* (2006.01)
*G06F 13/00* (2006.01)
*H04N 21/475* (2011.01)
*H04N 21/258* (2011.01)
(Continued)

(52) U.S. Cl.
CPC ....... *H04N 21/4756* (2013.01); *H04N 5/44543* (2013.01); *H04N 21/25891* (2013.01); *H04N 21/41407* (2013.01); *H04N 21/4668* (2013.01); *H04N 21/482* (2013.01); *H04N 21/4826* (2013.01); *H04N 21/8126* (2013.01)

(58) Field of Classification Search
USPC ................................................. 725/39, 40, 46
See application file for complete search history.

(56) References Cited

U.S. PATENT DOCUMENTS 7,296,284 B1 11/2007 Price et al.
7,617,511 B2 * 11/2009 Marsh .................... H04N 7/163
725/45

(Continued)

FOREIGN PATENT DOCUMENTS

CN 101540767 A 9/2009
CN 101583016 A 11/2009

(Continued)

*Primary Examiner* — Nasser Goddarzi
*Assistant Examiner* — Fred Peng
(74) *Attorney, Agent, or Firm* — Ling Wu; Stephen Yang; Ling and Yang Intellectual Property

(57) ABSTRACT

A method for implementing user scoring by utilizing a program service guide includes: a service guide server transmitting to a terminal a program service guide embedded with a scoring function; and the terminal submitting user scoring information to the service guide server. The present application further discloses a system for implementing user scoring by utilizing a program service guide. The above scheme embeds a scoring function into the program service guide, which increases the interaction between mobile TV users and operators, and enables a user to rate a channel, a program etc. by utilizing the program service guide, thus improving user experience.

10 Claims, 1 Drawing Sheet

(51) Int. Cl.
*H04N 21/414* (2011.01)
*H04N 21/482* (2011.01)
*H04N 21/466* (2011.01)
*H04N 21/81* (2011.01)

(56) References Cited

U.S. PATENT DOCUMENTS

| | | | |
|---|---|---|---|
| 7,987,182 B2 * | 7/2011 | Slothouber | G06F 17/30867 707/722 |
| 2003/0226144 A1 * | 12/2003 | Thurston | H04N 7/165 725/39 |
| 2008/0127241 A1 * | 5/2008 | Garcea | H04N 7/17318 725/24 |
| 2009/0055385 A1 * | 2/2009 | Jeon | H04N 5/44543 |
| 2009/0234828 A1 | 9/2009 | Tu | |
| 2009/0282438 A1 * | 11/2009 | White | G06Q 30/02 725/44 |
| 2010/0238183 A1 * | 9/2010 | Sakanaka | H04N 7/163 345/501 |
| 2011/0055871 A1 | 3/2011 | Bi et al. | |
| 2012/0030587 A1 | 2/2012 | Ketkar | |
| 2012/0030721 A1 * | 2/2012 | Smith | H04N 5/782 725/88 |

FOREIGN PATENT DOCUMENTS

| | | |
|---|---|---|
| CN | 102281466 A | 12/2011 |
| CN | 102802037 A | 11/2012 |

\* cited by examiner

METHOD AND SYSTEM FOR USER RATING BY UTILIZING PROGRAM SERVICE GUIDE

TECHNICAL FIELD

The present document relates to the field of mobile TV, and in particular, to a method and system for implementing user scoring by utilizing a program service guide.

BACKGROUND OF THE RELATED ART

Currently, domestic mobile TV services (MBBMS) have been carried out in depth, the user scale is close to millions and millions, operators provide differentiated sets, and hundreds of cities play respective different channels, to provide rich video services every day.

The largest difference between the mobile TV service and the traditional TV service is mobility and interaction. Specifically, mobile TV users can conveniently roam from a city to another city, and receive video services provided by different operators. Due to the characteristics of the mobile terminal, it decides that the mobile TV users can achieve convenient interaction with the operators, and transforms from passive service acceptance to interactive service selection.

The traditional mobile TV service guide does not embody the characteristics of interaction, and only plays a role in TV guide.

SUMMARY

In order to solve the above technical problem, the present document provides a method and apparatus for implementing user scoring by utilizing a program service guide, wherein a scoring function is embedded into the program service guide, thereby increasing the interaction between mobile TV users and operators. The specific technical scheme is as follows.

A method for implementing user scoring by utilizing a program service guide comprises:

a service guide server transmitting to a terminal a program service guide embedded with a scoring function; and the terminal submitting user scoring information to the service guide server.

Preferably, the scoring information comprises scores of a channel and/or a program and/or a set in the program service guide.

Preferably, the service guide server performs statistics on users' scores of channels and/or programs and/or sets submitted by all terminals, and displays scores after the statistics in a list corresponding to channels and/or programs and/or sets in a new program service guide; and if a channel and/or program and/or set are recorded in the new program service guide for the first time, the scores in the list corresponding to the channel and/or program and/or set are initial default values.

Preferably, an interval at which statistics is performed on users' scores of channels and/or programs and/or sets submitted by all terminals is set in the service guide server.

Preferably, the channels and/or programs and/or sets are ranked according to the scores after the statistics and the initial default values, and the channels and/or programs and/or sets are displayed according to the ranked order in the list corresponding to the channels and/or programs and/or sets.

Preferably, the service guide server transmits the new program service guide to the terminal.

Preferably, a condition in which the service guide server transmits the new program service guide to the terminal is that:

the service guide server receives a request for a new program service guide from the terminal; or a set time to transmit the new program service guide arrives.

The present document further provides a system for implementing user scoring by utilizing a program service guide, comprising:

a distribution module, located in a service guide server and configured to transmit to a terminal a program service guide embedded with a scoring function; and a scoring module, located in the terminal and configured to submit user scoring information to the service guide server.

Preferably, the scoring information comprises scores of a channel and/or a program and/or a set in the program service guide.

Preferably, the system further comprises:

a scores statistics module, located in the service guide server and configured to perform statistics on users' scores of channels and/or programs and/or sets submitted by all terminals, and a display module, located in the service guide server and configured to display scores after the statistics by the scores statistics module in a list corresponding to channels and/or programs and/or sets in a new program service guide;

wherein, if a channel and/or program and/or set are recorded in the new program service guide for the first time, the scores in the list corresponding to the channel and/or program and/or set are initial default values.

Preferably, the system further comprises:

a statistics timing module, located in the service guide server and configured to set an interval at which statistics is performed on users' scores of channels and/or programs and/or sets submitted by all terminals, and when the set time expires, notify the scores statistics module to perform statistics on the users' scores of channels and/or programs and/or sets submitted by all terminals within the set interval.

Preferably, the system further comprises:

a ranking module, located in the service guide server and configured to rank the channels and/or programs and/or sets according to the scores after the statistics by the scores statistics module and the initial default values; and the display module is further configured to display the channels and/or programs and/or sets according to the order ranked by the ranking module.

Preferably, the distribution module is further configured to transmit the new program service guide to the terminal.

Preferably, a condition in which the service guide server transmits the new program service guide to the terminal is that:

the service guide server receives a request for a new program service guide from the terminal; or a set time to transmit the new program service guide arrives.

The embodiment of the present invention embeds a scoring function into the program service guide, which increases the interaction between mobile TV users and operators, and enables a user to rate a channel, a program etc. by utilizing the program service guide, thus improving user experience.

PREFERRED EMBODIMENTS OF THE PRESENT INVENTION

The core idea of the embodiment of the present invention is that a service guide server transmits to a terminal a program service guide embedded with a scoring function; and the terminal submits user scoring information to the service guide server according to scores of a user, which increases the interaction between users and operators, thus improving user experience.

Figure 1:
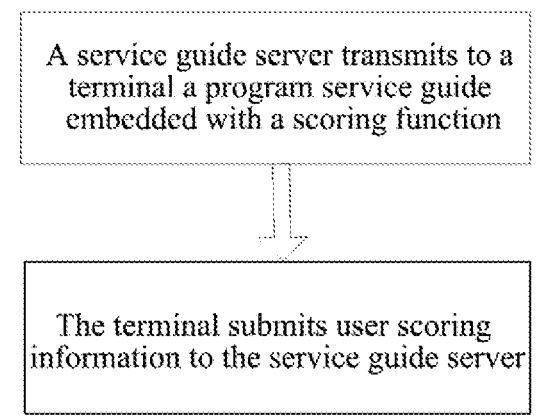
FIG. 1 is a flowchart of a method for user scoring by utilizing a program service guide according to an embodiment of the present invention.

As shown in FIG. 1, the embodiment of the present invention discloses a method for implementing user scoring by utilizing a program service guide, comprising:

a service guide server transmitting to a terminal a program service guide embedded with a scoring function; and the terminal submitting user scoring information to the service guide server.

The above scoring information may include scores of a channel and/or a program and/or a set in the program service guide. The present document does not limit the contents of the program service guide, and any content which can be added and recorded in the program service guide is included in the protection scope of the present document.

In the above embodiment, a function of statistics and display of the service guide server can be added. That is, the service guide server performs statistics on users' scores of channels and/or programs and/or sets submitted by all terminals, and displays scores after the statistics in a list corresponding to channels and/or programs and/or sets in a new program service guide;

wherein, if a channel and/or program and/or set are recorded in the new program service guide for the first time, the scores in the list corresponding to the channel and/or program and/or set are initial default values. When any channel, program and set are recorded in the service guide system side for the first time, the system allocates a default score thereto, wherein the default sore is configurable in the system scoring module, and may be adjusted as needed. The score is used as a presentation score when the terminal receives these newly added channels or programs for the first time, and at the same time may also be used as a basis for ranking when the terminal presents the list of channels, programs and sets.

In the above embodiment, an interval at which statistics is performed on users' scores of channels and/or programs and/or sets submitted by all terminals may be set in the service guide server. Within the interval, statistics is not performed on the scores.

In the above embodiment, a function of ranking and sequential display may further be added in the service guide server. That is, the channels and/or programs and/or sets are ranked according to the scores after the statistics and the initial default values, and the channels and/or programs and/or sets are displayed in the ranked order in the list corresponding to the channels and/or programs and/or sets.

In order to enable the user to learn all users' scores of various channels, programs or sets, so that the user can make a selection, the service guide server transmits to the terminal the scores after the statistics and the new program service guide generated according to the channels, programs or sets which is ranked in accordance with an order of the scores.

In the present embodiment, a condition in which the service guide server transmits the new program service guide to the terminal may further be set, i.e., the service guide server receives a request for a new program service guide from the terminal; or an interval at which the new program service guide is transmitted to the terminal may also be set, i.e., when it is the time set to transmit the new program service guide, transmission is performed to the terminal.

Figure 2:
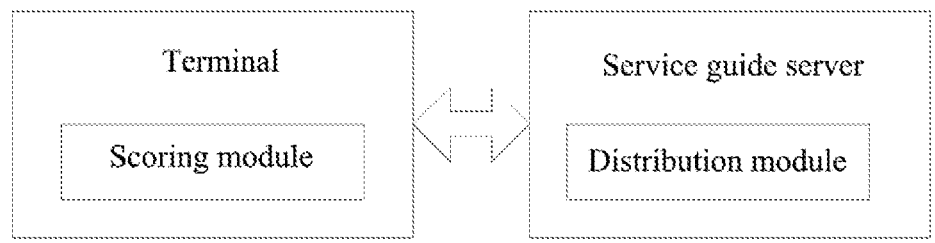
FIG. 2 is a flowchart of a structure of a system for user scoring by utilizing a program service guide according to an embodiment of the present invention.

As shown in FIG. 2, the embodiment of the present invention discloses a system for implementing user scoring by utilizing a program service guide, comprising:

a distribution module, located in a service guide server and configured to transmit to a terminal a program service guide embedded with a scoring function; and a scoring module located in a terminal and configured to submit user scoring information to the service guide server.

Wherein, the scoring information comprises scores of a channel and/or a program and/or a set in the program service guide.

In the present embodiment, the following modules may further be added:

a scores statistics module located in the service guide server and configured to perform statistics on users' scores of channels and/or programs and/or sets submitted by all terminals, and a display module located in the service guide server and configured to display scores after the statistics by the scores statistics module in a list corresponding to channels and/or programs and/or sets in a new program service guide;

wherein, if a channel and/or program and/or set are recorded in the new program service guide for the first time, the scores in the list corresponding to the channel and/or program and/or set are initial default values. When any channel, program and set are recorded in the service guide system side for the first time, the system allocates a default score thereto, wherein the default sore is configurable in the system scoring module, and may be adjusted as needed. The score is used as a presentation score when the terminal receives these newly added channels or programs for the first time, and may also be used as a basis for ranking when the terminal presents the list of channels, programs and sets.

In the present embodiment, the following modules may further be added:

a statistics timing module located in the service guide server and configured to set an interval at which statistics is performed on users' scores of channels and/or programs and/or sets submitted by all terminals, and when the set time expires, notify the scores statistics module to perform statistics on the users' scores of channels and/or programs and/or sets submitted by all terminals within the set interval.

In the present embodiment, the following modules may further be added:

a ranking module located in the service guide server and configured to rank the channels and/or programs and/or sets according to the scores after the statistics by the scores statistics module and the initial default values; and the display module further configured to display the channels and/or programs and/or sets according to the order ranked by the ranking module.

Preferably, the distribution module in the present embodiment is further configured to transmit the new program service guide to the terminal.

In the present embodiment, a condition in which the service guide server transmits the new program service guide to the terminal may further be set, i.e., the service guide server receives a request for a new program service guide from the terminal; or an interval at which the new program service guide is transmitted to the terminal may also be set, i.e., when it is the time set to transmit the new program service guide, transmission is performed to the terminal.

The present document is described by specific embodiments. However, those skilled in the art should understand that the present document may have various changes and equivalent substitutions. Therefore, any modification, equivalent substitution and improvement made within the spirit and principle of the present document should be included within the protection scope of the present document.

INDUSTRIAL APPLICABILITY

The present embodiment of the present invention embeds a scoring function into the program service guide, which increases the interaction between mobile TV users and operators, and enables a user to rate a channel, a program etc. by utilizing the program service guide, thus improving user experience.

What is claimed is:

1. A method for implementing user scoring by utilizing a program service guide, comprising:
   a service guide server transmitting to a terminal a program service guide embedded with a scoring function; and
   the terminal submitting user scoring information to the service guide server;
   wherein,
   the scoring information comprises scores of a channel and/or a program and/or a set in the program service guide,
   the service guide server performs statistics on users' scores of channels and/or programs and/or sets submitted by all terminals, and displays scores after the statistics in a list corresponding to channels and/or programs and/or sets in a new program service guide;
   the channels and/or programs and/or sets are ranked according to the scores after the statistics and the initial default values, and the channels and/or programs and/or sets are displayed according to the ranked order in the list corresponding to the channels and/or programs and/or sets; and
   the service guide server generates the new program service guide according to the channels, programs or sets which are ranked in accordance with an order of the scores.

2. The method according to claim 1, wherein, if a channel and/or program and/or set are recorded in the new program service guide for the first time, the scores in the list corresponding to the channel and/or program and/or set are initial default values.

3. The method according to claim 2, wherein, an interval at which statistics is performed on users' scores of channels and/or programs and/or sets submitted by all terminals is set in the service guide server.

4. The method according to claim 2, wherein, the service guide server transmits the new program service guide to the terminal.

5. The method according to claim 4, wherein, a condition in which the service guide server transmits the new program service guide to the terminal is that:
   the service guide server receives a request for a new program service guide from the terminal; or
   a set time to transmit the new program service guide arrives.

6. A system for implementing user scoring by utilizing a program service guide, comprising:
   a service guide server, configured to transmit to a terminal a program service guide embedded with a scoring function; and
   the terminal, configured to submit user scoring information to the service guide server;
   wherein, the scoring information comprises scores of a channel and/or a program and/or a set in the program service guide;
   the service guide server is further configured to:
   perform statistics on users' scores of channels and/or programs and/or sets submitted by all terminals;
   display scores after the statistics in a list corresponding to channels and/or programs and/or sets in a new program service guide;
   rank the channels and/or programs and/or sets according to the scores after the statistics and the initial default values;
   display the channels and/or programs and/or sets according to the order; and
   generate the new program service guide according to the channels, programs or sets which are ranked in accordance with an order of the scores.

7. The system according to claim 6, wherein
   the service guide server is further configured to:
   wherein, if a channel and/or program and/or set are recorded in the new program service guide for the first time, the scores in the list corresponding to the channel and/or program and/or set are initial default values.

8. The system according to claim 7, wherein,
   the service guide server is further configured to set an interval at which statistics is performed on users' scores of channels and/or programs and/or sets submitted by all terminals, and when the set time expires, perform statistics on the users' scores of channels and/or programs and/or sets submitted by all terminals within the set interval.

9. The system according to claim 7, wherein,
   the service guide server is further configured to transmit the new program service guide to the terminal.

10. The system according to claim 9, wherein, a condition in which the service guide server transmits the new program service guide to the terminal is that:
    the service guide server receives a request for a new program service guide from the terminal; or
    a set time to transmit the new program service guide arrives.

* * * * *